Aug. 26, 1952 A. H. SCHMIDT ET AL 2,608,191
COMBINATION PORTABLE ICEBOX AND COOKSTOVE
Filed Feb. 23, 1950 2 SHEETS—SHEET 1
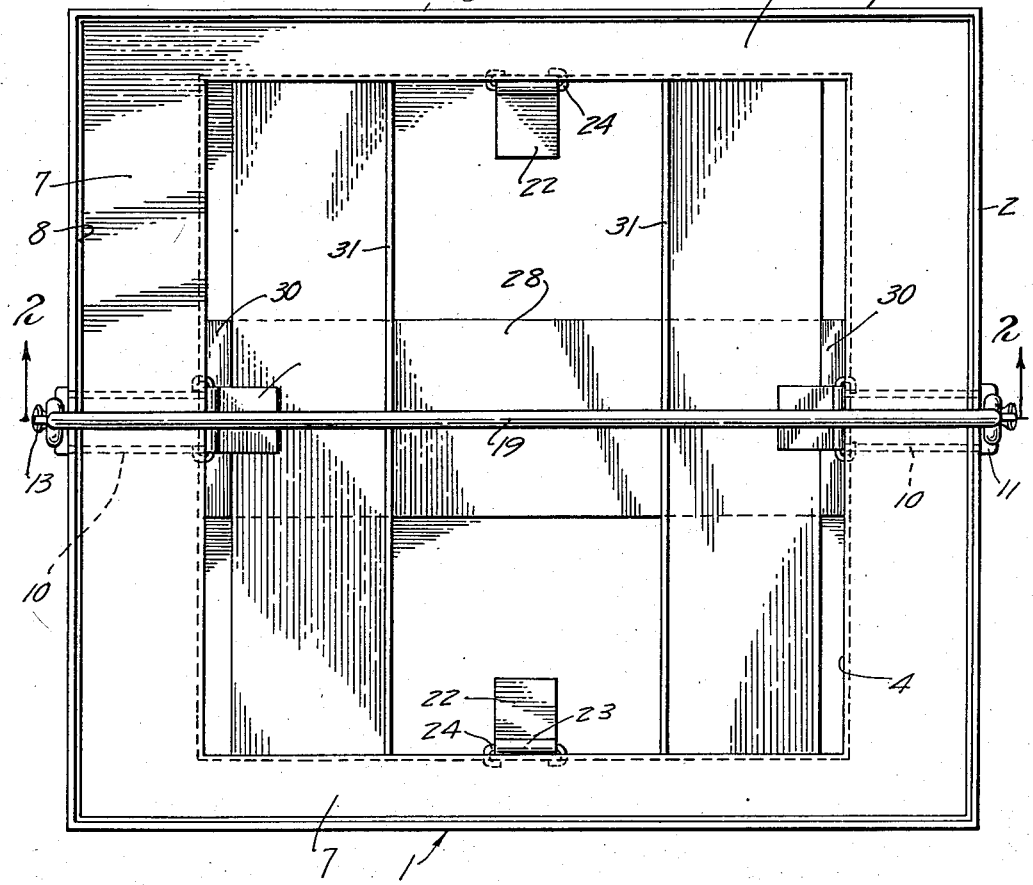
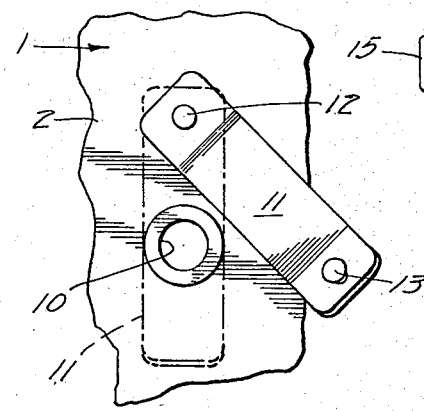
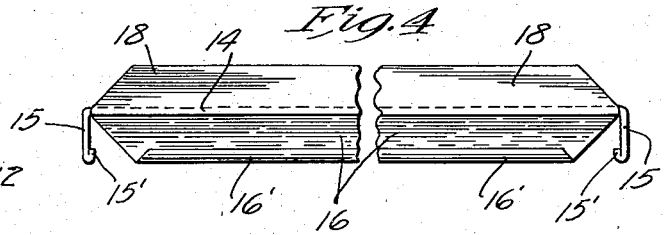
Inventors
Alois H. Schmidt
Walter J. Ekloff
By their Attorneys
Merchant & Merchant

UNITED STATES PATENT OFFICE 2,608,191

COMBINATION PORTABLE ICEBOX AND COOKSTOVE

Alois H. Schmidt, White Bear Lake, and Walter J. Eklof, St. Paul, Minn.

Application February 23, 1950, Serial No. 145,744

2 Claims. (Cl. 126—25)

Our invention relates to a novel combination portable ice box and cook stove or grill.

The primary object of our invention is the provision of a device of the class described, which can be quickly converted from a highly efficient food-carrying ice box to a food-cooking stove or grill of equal efficiency.

Another object of our invention is the provision of a device of the class described, which preferably utilizes charcoal or the like as fuel and in which the draft may be so regulated so as to give any desired degree of cooking temperature.

A still further object of our invention is the provision of a device of the class described, which may be utilized in the baking, broiling, or frying of foods, with equal efficiency and ease.

Another object of our invention is the provision of a device of the class described having a cooking well, and in further combination with partition means defining a central food storage or cooking chamber and laterally outwardly-spaced combustion chambers.

A still further object of our invention is the provision of a novel means for regulating the food container-supporting devices within the cooker at various levels.

The above and still further objects of our invention will become apparent from the following detailed specification, appended claims, and attached drawings.

Referring to the drawings, wherein like characters indicate like parts throughout the several views:

Fig. 1 is a view in plan of a combination portable ice box and cook stove built in accordance with our invention, the cover therefor being removed;

Fig. 3 is a fragmentary side elevation of an adjustable air inlet of our invention; and Fig. 4 is a fragmentary view in side elevation of the cover element of Fig. 2.

Figure 2:
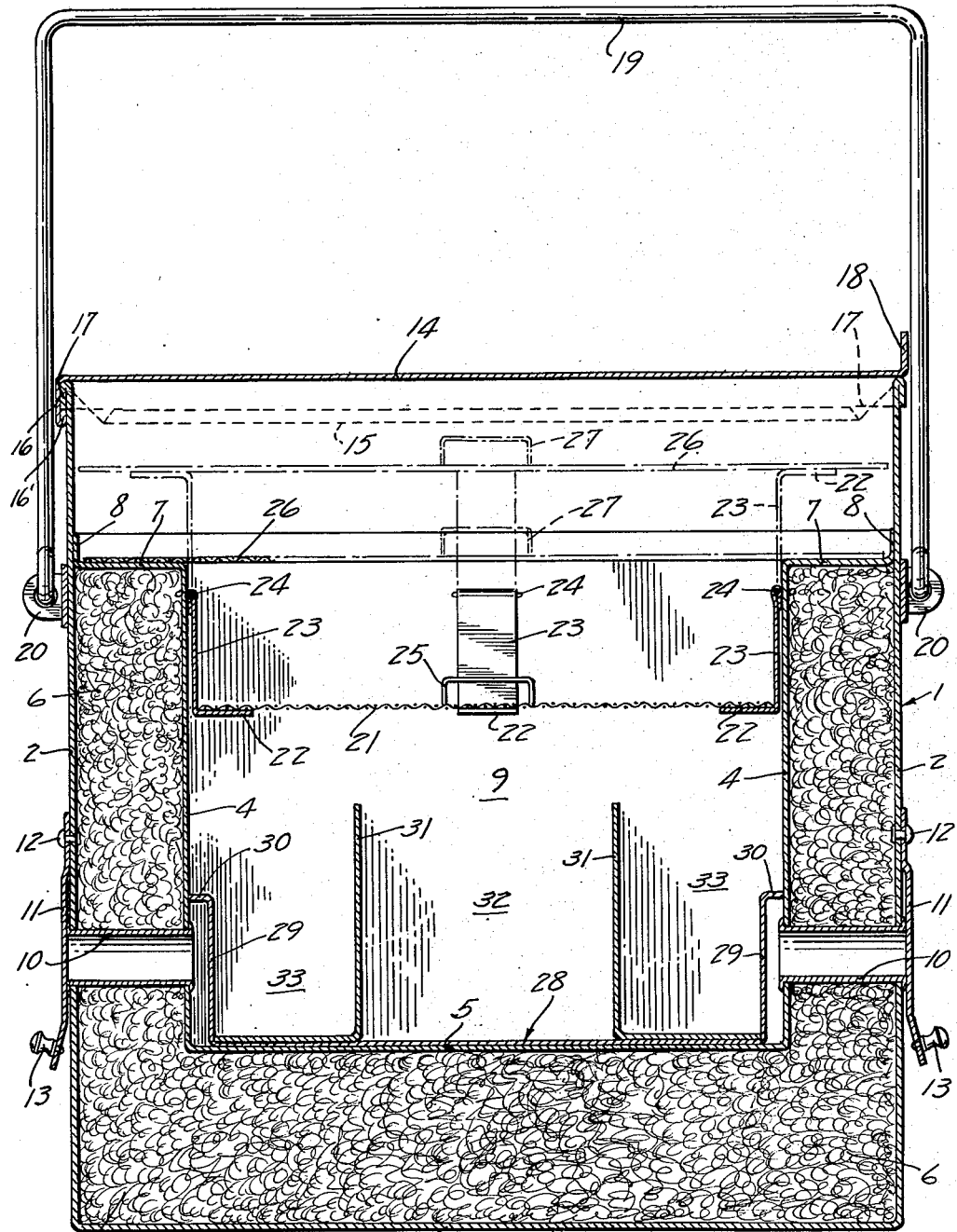
Fig. 2 is a vertical section taken substantially on the line 2—2 of Fig. 1.

Referring with greater particularity to the drawings, the numeral 1 indicates, in its entirety, a generally rectangular open-topped container having outer side walls 2 and a bottom wall 3. Inwardly-spaced from the outer side walls 2 are inner side walls 4 integrally formed with a bottom wall 5, which is upwardly spaced from the bottom wall 3, the space between the side walls 2 and 4 and the bottom walls 3 and 5 being filled with thermal-insulating material 6, such as spun glass or the like. As shown, the inner side walls 4 terminate short of the upper end of the container 1 and are formed to provide a shoulder 7 having an upwardly-extending flange 8 at its outer peripheral edge, which abuts the inner faces of the outer side walls 2 and is spot-welded or otherwise rigidly secured thereto.

The inner side walls 4 and bottom wall 5 define a well 9 which may be interchangeably utilized as a combustion chamber and oven or to contain ice or a like refrigerant for storing foods in a cold condition. Extending between opposite pairs of outer and inner side walls 2 and 4 respectively are a pair of axially-aligned tubular air inlets 10 located adjacent the bottom of the well 9. Flow of air through the inlets 10 to the well 9 from the exterior of the container 1 is adjustable by means of a pair of identical shutter elements 11 pivotally mounted to the outer side walls 2, as indicated at 12, for swinging movements, one each over the outer end of each of the inlets 10. The shutter elements 11 are preferably made from resilient sheet metal and are biased in the direction of the inlets 10 so as to effectively seal same against air flow thereinto. Knobs or handles 13 at the lower end portions of the shutters 11 enable the user to readily swing the shutters to an open position, as indicated by full lines in Fig. 3, so as to permit air to enter the well 9 to a greater or lesser degree through either or both of the inlets 10.

The open top of the container 1 is adapted to be closed by a relatively flat cover element 14 which, at its sides and one end, is provided with depending flanges 15 and 16 respectively. The flanges 15 and 16 have upturned lower edge portions 15' and 16' respectively that engage the lower edge portions of downturned guide elements 17 at the upper ends of the side walls 2. At one end, the cover 14 is provided with an upwardly-projecting lip 18, which provides a handle whereby the cover element 14 may be slidably moved to provide an air outlet opening for the well 9. The cover element 14 may be slidably removed entirely from the container 1 to provide free access to the well 9. When the cover element 14 is moved slightly out of complete registration with the open top of the container 1, the opening formed thereby cooperates with the air inlet passages 10 to provide ventilation or draft in the well 9. A carrying handle or bail 19 is pivotally mounted in a pair of ears 20 rigidly secured to the container 1 and may be swung away from its position of Figs. 1 and 2 to permit sliding movements of the cover element 14 with respect to the container 1.

For supporting food containers, such as baking dishes, pans, or the like, we provide a relatively rigid perforate shelf element in the nature of a screen 21, which is adapted to rest upon a plurality of laterally inwardly-extended feet 22, one each of which comprises the lower end of an L-shaped bracket 23 mounted at its opposite end for pivotal movements to the inner side walls 4, as indicated at 24. As shown, the brackets 23 are four in number and may be pivotally moved from their lower limit of movement, wherein the feet 22 thereof are contained within the well 9, and, as indicated by full lines in Fig. 2, to another extreme limit of pivotal movement, wherein the feet 22 extend laterally outwardly in the space between the shoulders 7 and the cover element 14, as indicated by broken lines in Fig. 2. It will further be seen, by reference to Fig. 2, that the perforate shelf 21 is provided with a handle or the like 25, so that the same may be readily removed from the container. A second perforate shelf 26, similar in all respects to the shelf 21, except that it is larger in size, is adapted to rest upon the shoulder 7 or, if desired, upon the feet 22 of the brackets 23, when said brackets are moved to their upper broken line positions of Fig. 2. The perforate shelf 26, like the shelf 21, is provided with a handle element 27 by which the same may be inserted or removed. It will be appreciated, of course, that the shelf element 26 may be placed upon the shoulders 7 only if the brackets 23 are in their lower positions within the well 9. From the above, it will be seen that food to be heated may be placed in almost any desired spaced relationship to the bottom of the well 9 so as to obtain the desired degree of cooking heat. Only one shelf 21 or 26 is used at a given time. Obviously, when the shelf 26 is used, the shelf 21 is removed.

Primarily for use when our improved container is to be utilized as a stove or cooker is a removable generally U-shaped support 28, the intermediate portion of which is adapted to rest upon the inner bottom wall 5 of the container 1. Generally vertical legs 29 of the support 28 are inwardly-spaced, one each from one of the inlets 10, and serve as baffle plates for air entering the well 9 from the inlet passages 10. The upper ends of the legs 29 are outturned, as indicated at 30, and have frictional engagement with opposite side walls 4 above the inlets 10, thus holding the support 28 in position within the well 9. Rigidly mounted on the intermediate portion of the support 28 is a pair of partitions 31. Said partitions 31 are vertically-disposed and extend across the well 9 transversely of the axis of the inlets 10 and are in spaced relation to each other and to the legs 29 of the support 28, whereby to provide a baking or storage compartment 32 therebetween and a pair of spaced heat exchange or combustion compartments 33 between each thereof and an adjacent inner side wall 4. Smokeless fuel, such as charcoal, may be placed in one or both of the compartments 33, to provide sufficient heat to adequately bake food articles placed in the intermediate compartment 32 or on the shelves 21 and 26, the speed of combustion and resultant heat emanating from the compartments 33 being regulated by the shutters 11 and the cover element 14. The relatively thick insulation 6 permits the container 1 to be placed in a vehicle or in any desired location without the danger of damage to articles near the same from the heat therein; and, when the same is used as a portable refrigerator, the insulation will be effective in maintaining the satisfactory refrigerator temperature for foods stored therein. When our device is used as a cold storage box, the support 28 and partitions 31 mounted thereon may be removed, if desired, simply by lifting the same out from the well 9, thereby permitting a more efficient distribution of food or ice within the well 9.

Our invention has been thoroughly tested and found to be fully satisfactory for the accomplishment of the objectives set forth; and, while we have shown and described a commercial embodiment of our novel device, it should be understood that the same is capable of modification without departure from the scope and spirit of the invention, as defined by the claims.

What we claim is:

1. In a device of the class described, a generally rectangular open top container having spaced inner and outer side walls and bottom walls, the inner walls thereof defining an upwardly-opening well, thermal-insulating means in the space between said inner and outer walls, a pair of axially-aligned air inlets in opposite sides of said container adjacent the bottom of said well, a generally U-shaped removable support on the bottom of said well, each of the opposite legs of said support extending upwardly beyond and in inwardly-spaced relation to the inner ends of one of said inlets and being bent outwardly above said air inlets, the free ends of said support having frictional engagement with the inner side walls above said inlets, a pair of generally vertical partitions mounted on the intermediate portion of said support and extending transversely of the axis of said inlets, said partitions being spaced from each other and from said baffles, whereby to provide a central food storage compartment and spaced heat exchange compartments, and a cover for the open upper end of said container, said cover providing adjustable air outlet means therefor.

2. In a device of the class described, a container having spaced side walls and a bottom wall, thermal-insulating means in the space between said inner and outer walls, said inner wall defining an upwardly-opening well, a vertically-disposed partition element in the bottom of said well dividing the same into a food storage compartment and a heat exchange compartment, an adjustable air inlet through the wall of said container leading to said heat exchange compartment, removable cover means for the upper end of said container, said cover means providing an adjustable air oulet from said well, said partition being removably secured in said well, and a support for said partition, said support having a vertically-extended baffle portion in closely-spaced relationship to the inner end of said inlet, said baffle at its upper end extending laterally-outwardly whereby to engage the inner wall of said container above said inlet.

ALOIS H. SCHMIDT.
WALTER J. EKLOF.

REFERENCES CITED

The following references are of record in the file of this patent:

UNITED STATES PATENTS

| Number | Name | Date |
|---|---|---|
| 832,321 | Jarvis | Oct. 2, 1906 |
| 968,165 | Kellogg | Aug. 23, 1910 |
| 1,402,602 | Hansen | Jan. 3, 1922 |
| 2,158,236 | Haislip | May 16, 1939 |
| 2,196,035 | Shaw | Apr. 2, 1940 |
| 2,531,684 | Jackson | Nov. 28, 1950 |